United States Patent
Liu et al.

(10) Patent No.: US 10,282,233 B2
(45) Date of Patent: May 7, 2019

(54) MODULAR ELECTRONIC DEVICES WITH PREDICTION OF FUTURE TASKS AND CAPABILITIES

(71) Applicant: Google Inc., Mountain View, CA (US)

(72) Inventors: Eric H C Liu, Redwood City, CA (US); Kevin D. Brune, Maple Valley, WA (US); Yoshimichi Matsuoka, Sunnyvale, CA (US); Gilbert Cabillic, Brece (FR); Gaurav Shah, San Jose, CA (US)

(73) Assignee: Google LLC, Mountain View, CA (US)

( * ) Notice: Subject to any disclaimer, the term of this patent is extended or adjusted under 35 U.S.C. 154(b) by 471 days.

(21) Appl. No.: 15/130,174

(22) Filed: Apr. 15, 2016

(65) Prior Publication Data
US 2017/0300364 A1   Oct. 19, 2017

(51) Int. Cl.
*G06F 9/46* (2006.01)
*G06F 9/50* (2006.01)
*H04W 4/029* (2018.01)

(52) U.S. Cl.
CPC .......... *G06F 9/5055* (2013.01); *G06F 9/5027* (2013.01); *H04W 4/029* (2018.02); *G06F 2209/503* (2013.01)

(58) Field of Classification Search
CPC .................................................. G06F 9/5055
See application file for complete search history.

(56) References Cited

U.S. PATENT DOCUMENTS

| 5,809,325 A | 9/1998 | Hinton et al. |
| 6,069,911 A | 5/2000 | Sealander et al. |
| 6,282,561 B1 | 8/2001 | Jones et al. |

(Continued)

FOREIGN PATENT DOCUMENTS

| EP | 2073463 | 6/2009 |
| EP | 2749200 | 7/2014 |

OTHER PUBLICATIONS

International Search Report for PCT/US2016/062667 dated Mar. 8, 2017 13 pages.

(Continued)

*Primary Examiner* — Emerson C Puente
*Assistant Examiner* — Steven M Do
(74) *Attorney, Agent, or Firm* — Dority & Manning P.A.

(57) ABSTRACT

The present disclosure provides modular electronic devices that are capable of predicting future availability of module combinations and associated computing resources and/or capable of predicting future tasks. Based on such predictions, the module or modular electronic device can choose to schedule or delay certain tasks, alter resource negotiation behavior/strategy, or select from among various different resource providers. As an example, a modular electronic device of the present disclosure can identify one or more computing tasks to be performed; predict one or more future sets of computing resources that will be respectively available to the modular electronic device at one or more future time periods; and determine a schedule for performance of the one or more computing tasks based at least in part on the prediction of the one or more future sets of computing resources that will be respectively available at the one or more future time periods.

13 Claims, 8 Drawing Sheets

(56) References Cited

U.S. PATENT DOCUMENTS

| | | |
|---|---|---|
| 6,771,595 B1 | 8/2004 | Gilbert et al. |
| 6,785,889 B1 | 8/2004 | Williams |
| 6,941,399 B2 | 9/2005 | Loh |
| 6,961,575 B2 | 11/2005 | Stanforth |
| 6,968,323 B1 | 11/2005 | Bansal et al. |
| 6,975,613 B1 | 12/2005 | Johansson |
| 7,009,939 B2 | 3/2006 | Baker et al. |
| 7,043,225 B1 | 5/2006 | Patel et al. |
| 7,058,387 B2 | 6/2006 | Kumar et al. |
| 7,184,759 B2 | 2/2007 | Date et al. |
| 7,257,632 B2 | 8/2007 | Zhang et al. |
| 7,340,759 B1 | 3/2008 | Rodriguez |
| 7,346,354 B2 | 3/2008 | Patel |
| 7,463,890 B2 | 12/2008 | Herz et al. |
| 7,489,656 B2 | 2/2009 | Guo et al. |
| 7,689,681 B1 | 3/2010 | David |
| 7,720,968 B2 | 5/2010 | Clark, Jr. et al. |
| 7,788,133 B2 | 8/2010 | Delenda |
| 8,027,684 B2 | 9/2011 | Gupta et al. |
| 8,028,057 B2 | 9/2011 | David |
| 8,156,500 B2 | 4/2012 | Helander |
| 8,185,909 B2 | 5/2012 | Sigal et al. |
| 8,249,984 B2 | 8/2012 | Dawson et al. |
| 8,276,143 B2 | 9/2012 | Vengerov et al. |
| 8,296,770 B2 | 10/2012 | Ohno |
| 8,320,414 B2 | 11/2012 | Dawson et al. |
| 8,355,670 B2 | 1/2013 | White |
| 8,424,007 B1 | 4/2013 | Hernacki et al. |
| 8,520,535 B2 | 8/2013 | Dawson et al. |
| 8,667,065 B1 | 3/2014 | Odom |
| 8,694,968 B2 | 4/2014 | Eteminan et al. |
| 8,730,994 B2 | 5/2014 | Kannan et al. |
| 8,782,211 B1 | 7/2014 | Sharma |
| 8,843,933 B1 | 9/2014 | Holler et al. |
| 9,003,039 B2 | 4/2015 | Amorim |
| 9,015,708 B2 | 4/2015 | Choudhury et al. |
| 9,031,531 B2 | 5/2015 | Miluzzo et al. |
| 9,037,508 B2 | 5/2015 | Dawson et al. |
| 9,038,195 B2 | 5/2015 | Satpathy et al. |
| 9,075,659 B2 | 7/2015 | Barzel et al. |
| 9,078,274 B2 | 7/2015 | Guo |
| 9,083,819 B2 | 7/2015 | Chan et al. |
| 9,118,750 B2 | 8/2015 | Vossoughi et al. |
| 9,148,473 B1 | 9/2015 | Sharma |
| 9,229,781 B2 | 1/2016 | Karaoguz et al. |
| 9,241,304 B2 | 1/2016 | Dawson et al. |
| 2002/0058499 A1 | 5/2002 | Ortiz |
| 2003/0139199 A1 | 7/2003 | Kinnula et al. |
| 2003/0217129 A1 | 11/2003 | Knittel et al. |
| 2004/0111308 A1 | 6/2004 | Yakov |
| 2004/0128262 A1 | 7/2004 | Nafousi |
| 2004/0156312 A1 | 8/2004 | Salonidis et al. |
| 2004/0165548 A1 | 8/2004 | Backes |
| 2004/0203820 A1 | 10/2004 | Billhartz |
| 2006/0007955 A1 | 1/2006 | Kotzin |
| 2006/0167784 A1 | 7/2006 | Hoffberg |
| 2006/0168571 A1 | 7/2006 | Ghiasi et al. |
| 2007/0179829 A1 | 8/2007 | Laperi et al. |
| 2007/0230421 A1 | 10/2007 | Roadknight |
| 2007/0294692 A1 | 12/2007 | Zhao et al. |
| 2008/0040481 A1 | 2/2008 | Joshi et al. |
| 2008/0298284 A1 | 12/2008 | Dawson et al. |
| 2008/0298314 A1 | 12/2008 | Dawson et al. |
| 2008/0300890 A1 | 12/2008 | Dawson et al. |
| 2008/0301017 A1 | 12/2008 | Dawson et al. |
| 2008/0313642 A1 | 12/2008 | Karaoguz et al. |
| 2009/0025004 A1 | 1/2009 | Barnard et al. |
| 2009/0106730 A1 | 4/2009 | Mockford |
| 2009/0180430 A1 | 7/2009 | Fadell |
| 2009/0228888 A1 | 9/2009 | Vengerov et al. |
| 2009/0271324 A1 | 10/2009 | Jandhyala et al. |
| 2010/0223385 A1 | 9/2010 | Gulley et al. |
| 2010/0251259 A1 | 9/2010 | Howard |
| 2010/0332262 A1 | 12/2010 | Horvitz et al. |
| 2011/0288905 A1 | 11/2011 | Mrakas |
| 2011/0320233 A1 | 12/2011 | Arnette et al. |
| 2012/0079097 A1 | 3/2012 | Gopisetty et al. |
| 2012/0198462 A1 | 8/2012 | Cham et al. |
| 2012/0324111 A1 | 12/2012 | Barzel et al. |
| 2013/0042004 A1 | 2/2013 | Boss et al. |
| 2014/0067496 A1 | 3/2014 | Buswell |
| 2014/0149987 A1* | 5/2014 | Barillari ............... G06F 9/4843 718/101 |
| 2014/0195683 A1 | 7/2014 | Ammerman, III et al. |
| 2014/0307635 A1 | 10/2014 | Agrawal et al. |
| 2015/0026336 A1 | 1/2015 | Suchter et al. |
| 2015/0067022 A1 | 3/2015 | Subbiah |
| 2015/0074635 A1 | 3/2015 | Margiotta et al. |
| 2015/0081877 A1 | 3/2015 | Sethi et al. |
| 2015/0195011 A1 | 7/2015 | Birgel et al. |
| 2015/0206228 A1 | 7/2015 | Perez et al. |
| 2016/0301624 A1* | 10/2016 | Gonzalez ............. G06F 9/5083 |

OTHER PUBLICATIONS

Haojun et al., "Task Scheduling Prediction Algorithms for Dynamic Hardware/Software Partitioning", 2012 Fifth International Symposium on Parallel Architectures, Algotithms and Programming, Dec. 17, 2012, pp. 80-85.

* cited by examiner

MODULAR ELECTRONIC DEVICES WITH PREDICTION OF FUTURE TASKS AND CAPABILITIES

FIELD

The present disclosure relates generally to modular electronic devices and ad hoc combinations of modules and modular electronic devices. More particularly, the present disclosure relates to modular electronic devices that are capable of scheduling task operation based on prediction of future capabilities that can become available and/or based on prediction of future tasks to be performed.

BACKGROUND

Modular systems such as a modular electronic device can have multiple different modular electronic components, which can be referred to as "modules." Modules can be removable, replaceable, and/or interchangeable. In general, different modules of a modular device or system can be capable of performing different functions, including a specialized function and/or one or more general functions.

As an example, specialized modules can perform one or more specific functions using one or more specific resources. Examples of specialized modules includes a camera module, a battery module, or other module configured to perform a particular task. Thus, in some examples, the specific functions can include capturing an image, supplying power, or performing a specific function using special hardware (e.g., performing a cryptographic function, a graphics processing function, etc.).

Other modules can have the capability to perform general functions using their general resources, such as a memory and a processor. For example, modules can have the ability to communicate with an external module or device (e.g., through a hardwired connection or using a wireless connection). Examples of general functions include performing a processing task, storing data in memory, or utilizing communication bandwidth.

Modules can be combined with other modules or devices. In some examples, such combination can utilize physical combination, for example, by attaching modules to each other or a common structure. For example, a processing module from a modular phone can be removably physically combined with an interface module (e.g., HDMI or USB) to provide video-playback functionality. In other examples, combinations of modules can include physically unconnected devices, such as, for example, modules that are communicatively connected over one or more wireless communication links.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for scheduling task performance based on prediction of future capabilities. The method includes identifying, by a modular electronic device that includes at least one electronic module, one or more computing tasks to be performed. The method includes predicting, by the modular electronic device, one or more future sets of computing resources that will be respectively available to the modular electronic device at one or more future time periods. The method includes determining, by the modular electronic device, a schedule for performance of the one or more computing tasks based at least in part on the prediction of the one or more future sets of computing resources that will be respectively available at the one or more future time periods.

Another example aspect of the present disclosure is directed to a modular electronic device. The modular electronic device includes at least one processor and at least one electronic module. The modular electronic device: identifies one or more computing tasks to be performed; predicts one or more future sets of computing resources that will be respectively available to the modular electronic device at one or more future time periods; and determines a schedule for performance of the one or more computing tasks based at least in part on the prediction of the one or more future sets of computing resources that will be respectively available at the one or more future time periods.

Another example aspect of the present disclosure is directed to at least one non-transitory computer-readable medium that stores instructions that, when executed by at least one processor, cause the at least one processor to identify one or more computing tasks to be performed. Execution of instructions causes the at least one processor to predict one or more future sets of computing resources that will be respectively available to the modular electronic device at one or more future time periods. At least one of the one or more future sets of computing resources are provided by one or more electronic modules of one or more modular electronic devices accessible over an ad hoc wireless network. Execution of the instructions causes the at least one processor to determine a schedule for performance of the one or more computing tasks based at least in part on the prediction of the one or more future sets of computing resources that will be respectively available at the one or more future time periods.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
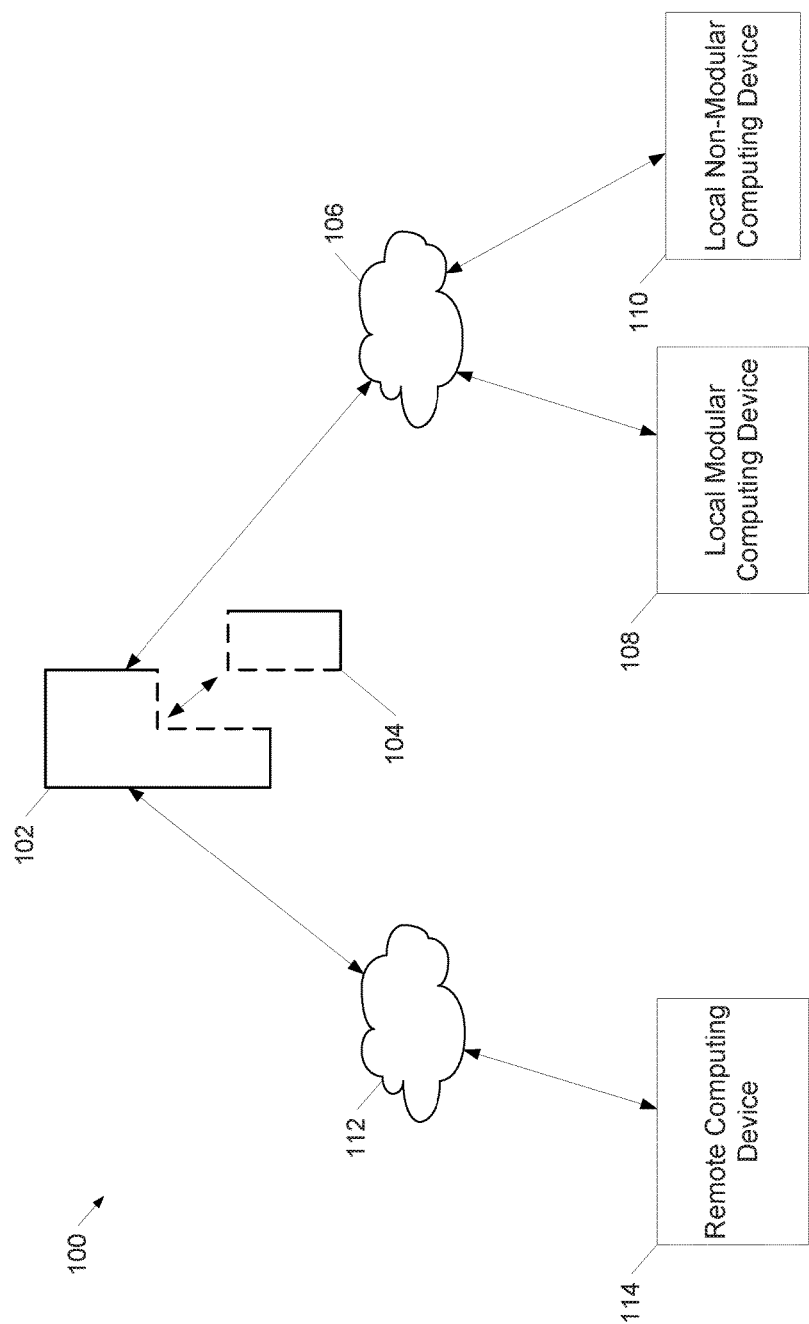
FIG. 1 depicts a block diagram of an example ad hoc combination of modules and devices according to example embodiments of the present disclosure.

Generally, the present disclosure is directed to modular electronic devices and associated methods of operation. In particular, the present disclosure relates to ad hoc combinations of modules and other devices that can sense each other, connect, and share functionality. Modules can discover each other's presence and availability and can advertise their own availability, capabilities, and price. Modules can negotiate use of other modules' resources, identify tasks suitable for a current module network environment, and assign tasks using resources of different modules to complete the tasks.

More particularly, the present disclosure is directed to electronic modules or modular electronic devices that are capable of predicting future availability of module combinations and associated computing resources and/or capable of predicting tasks that will be requested to be performed in the future. Based on such predictions, the module or modular electronic device can choose to schedule or delay certain tasks, alter resource negotiation behavior/strategy, and/or select from among various different resource providers. As an example, a modular electronic device of the present disclosure can identify one or more computing tasks to be performed; predict one or more future sets of computing resources that will be respectively available to the modular electronic device at one or more future time periods; and determine a schedule for performance of the one or more computing tasks based at least in part on the prediction of the one or more future sets of computing resources that will be respectively available at the one or more future time periods.

Thus, the modular electronic device can use predictions of future sets of computing resources to more efficiently schedule performance of computing tasks. The computing tasks can be currently requested computing tasks or can be future computing tasks that the modular electronic device has predicted will be requested. Example computing tasks can include a processing task (e.g., an encryption task), a communication task (e.g., a communications passthrough), a storage task (e.g., a specialized secure storage task), a data collection task (e.g., operation of a sensor such as a temperature sensor, biometric sensor, etc.), or other tasks, operations, or actions to be performed by a module or device.

In addition to the one or more future sets of computing resources, the modular electronic device can also determine a current set of computing resources that are available to the modular electronic device during a current time period. Based on a comparison of the current set of resources to the one or more future sets of resources, the modular electronic device can determine whether to perform a particular computing task with the current set of computing resources during the current time period or to schedule the particular computing task for performance by one of the future sets of computing resources in one of the future time periods.

As an example, the modular electronic device can predict that a particular task will be requested to be performed in at least one of the future time periods. The modular electronic device can choose to perform the future task in advance using the current resources, or can wait to perform the task using one of the future sets of computing resources.

In one example of such scenario, a modular electronic device can determine that the current set of computing resources is capable of performing the future task and that at least one of the future sets of computing resources is incapable of performing the first computing task. In response, the modular electronic device can cause performance of the future computing task by the current set of computing resources during the current time period. Thus, if future sets of computing resources are incapable of performing a predicted future task, the modular electronic device can perform or negotiate performance of the future task using the currently available computing resources, which are capable of performing the task.

As such, future tasks which are predicted to be requested during a future period in which appropriate computing resources are not available can be performed in advance while the appropriate resources are available. For example, if a user of the modular electronic device typically requests download of an electronic newspaper at 8 am, but the user's calendar data indicates that the user will be travelling by aircraft at 8 am, the modular electronic device can download the electronic newspaper in advance while wide area network communication resources are available. Thus, in some implementations, future tasks can be predicted by identifying patterns of tasks requested by a user or otherwise performed by the device.

In some implementations, predictions regarding future resource availability can further be used to guide selection of the module or device from which resources are negotiated and received. As an example, a modular electronic device using resources from a particular module or device can predict that such particular module is about to become unavailable. The modular electronic device can change its communication to use resources from one or more other modules that are predicted to remain available longer. For example, the modular electronic device can stop receiving data from a server device if it predicts that the server connection will be soon lost, and can start communicating with a local device having needed resources. In another example, the modular electronic device can predict that a module of a module network is about to become unavailable and can schedule a tasklet on an alternate module (e.g., a cloud-based module) based on the prediction.

According to another aspect of the present disclosure, the modular electronic device can also predict one or more expected costs respectively associated with performance of a particular computing task by the one or more future sets of computing resources that are predicted to be respectively available to the modular electronic device at the one or more future time periods. In particular, as noted above, modules can negotiate use of other devices'/modules' resources. The negotiation can result in an agreed upon cost or other exchange to compensate for use of such resources. Thus, in addition to prediction of future sets of computing resources, the modular electronic device can further predict respective costs associated with use of such future resources. In some implementations, the modular electronic device can predict the costs based on previous negotiations and/or previous observations of advertisements from such resource-providing modules or devices.

The modular electronic device can determine the schedule for performance of the one or more computing tasks based at least in part on the one or more expected costs respectively associated with the one or more future sets of computing resources. For example, the modular electronic device can determine a schedule which minimizes expected cost of having the computing tasks performed. The schedule can also comply with one or more deadlines respectively associated with the computing tasks, if any.

Alternatively and/or additionally to scheduling tasks based on expected cost, the modular electronic device can further perform negotiations for resources (e.g., either as resource-requestor or resource-provider) based on expected costs associated with predicted future sets of computing resources. For example, the modular electronic device can offer a particular price to a currently available module or device to perform a particular task, where the particular price is a function of an expected cost associated with a resource of a device predicted to be available in the future and a determined probability that such resource will, in fact, be available in the future (e.g., in the future and prior to a deadline associated with the particular task). Other negotiating schemes can be used as well which leverage prediction of future resource availability and/or prediction of future resource cost to assist in setting negotiation limits or other values.

According to further aspects of the present disclosure, the modular electronic device can analyze various types of data to predict the future sets of computing resources. As an example, a modular electronic device of the present disclosure can receive location data associated with the modular electronic device and/or a user of the device. The modular electronic device can predict a destination based at least in part on the location data and can determine a first set of computing resources associated with the destination.

As examples, the location data can include global positioning system data, calendar data that describes one or more future appointment locations, email or messaging data that describes future locations, mapping data that describes one or more locations for which a user has searched, and/or other forms of location data and/or user data. Thus, in some implementations, user information such as location data and/or user data can be analyzed to enable prediction of future computing resources. In some implementations, the user can be provided with controls that allow the user to make an election as to both if and when systems, programs or features described herein can enable collection of such user information (e.g., location data or other user information). However, if the user does not enable collection and use of such user information, the user may not receive the benefits associated therewith as described herein. In addition, certain data can be treated in one or more ways before it is stored or used, so that personally identifiable information is removed. Thus, the user can have control over what information is collected about the user, how that information is used, and what information is provided to the user.

As one example technique to predict future resource availability, a modular electronic device can determine that it is moving towards a particular destination based on the above-described location data. For example, location data derived from GPS sensors included within a modular electronic device can be analyzed to predict a destination. However, the device can determine that it currently lacks the ability to download a map of the destination. In response, the device can opportunistically form a network with a high-bandwidth module that is currently available to download the map and send it to the device. Thus, the modular electronic device can engage in ad hoc network creation to form advantageous connections which increase resource availability for execution of current or future tasks.

As another example, the modular electronic device can identify one or more location patterns exhibited by location data that describes a historical location of the modular electronic device and/or a user of the modular electronic device. Based on such location patterns, the modular electronic device can predict the one or more future sets of computing resources that will be respectively available to the modular electronic device at the one or more future time periods. For example, the location data can exhibit a location pattern that indicates that the user goes to a particular workplace location around 9 am every weekday. Based on such example location pattern, the modular electronic device can predict that a desktop work computer with various computing resources (e.g., a higher power graphics processing unit) will be available to the modular electronic device around 9 am every weekday.

As yet another example technique to predict future resource availability, the modular electronic device can access a map that describes available computing resources at various locations. The modular electronic device can use the map and one or more predicted future locations to determine the one or more future sets of computing resources that are expected to be available to the modular electronic device.

More particularly, according to another aspect of the present disclosure, as advertisements of different devices and associated resources/capabilities are observed over time, a map can be built that describes available computing resources at various locations. In some implementations, each particular modular electronic device builds and stores its own map based on its own observations. Alternatively or additionally, a map can be built and/or stored at a central location (e.g., at a server computing device) using observations reported back by many different computing devices and then aggregated. A given modular electronic device can then communicate with the server computing device to access the resource map. In some implementations, the resource map can include a time dimension which indicates, for each of various locations, changing availability of resources over time (e.g., versus time of day for each day of the week).

Thus, the present disclosure provides electronic modules or modular electronic devices that are capable of predicting future availability of module combinations and associated computing resources and/or capable of predicting tasks be performed in the future. Based on such predictions, the module or modular electronic device can choose to schedule or delay certain tasks, alter negotiation behavior/strategy, or select from among various different resource providers.

Furthermore, example techniques or operations described herein as being performed by a modular electronic device can additionally and/or alternatively be performed by a server computing device in communication with the modular electronic device. For example, in some implementations, a server computing device can predict future resource availability and/or future task requests for a particular modular electronic device and then communicate such predictions to the particular modular electronic device. In addition, although the example techniques or operations described herein are discussed with reference to a modular electronic device, such techniques and operations are equally applicable to standard, non-modular computing devices. For example, in some implementations, a non-modular computing device (e.g., laptop or traditional smartphone) can predict future availability of computing resources (e.g., resources provided by modular and/or non-modular devices) over an ad hoc network, and can schedule task performance based on such predictions.

With reference now to the Figures, example embodiments of the present disclosure will be discussed in further detail.

Example Devices and Systems

FIG. 1 depicts a block diagram of an example system 100 that includes a modular electronic device 102 participating in an ad hoc combination of devices on a wireless network 106 according to example embodiments of the present disclosure. The example modular electronic device 102 includes one or more electronic modules that can be removably coupled to the modular electronic device 102. Each module of the modular electronic device 100 can include and provide a particular set of capabilities based on its own respective on-board components, including processing, memory storage, etc. A single representative example electronic module 104 is illustrated in FIG. 1 for the purposes of explanation. However, the modular electronic device 102 can have any number of electronic modules. In particular, the number of electronic modules included in the modular electronic device 102 can change over time as modules are swapped in and out of the device 102.

According to aspects of the present disclosure, the modular electronic device 100 is capable of participating (e.g., by way of the module 104) in ad hoc combinations of modules and other devices that can sense each other, connect, and share functionality. For example, the ad hoc combination of modules can include a plurality of modules that are each physically coupled to the device 102. Alternatively or additionally to the physically coupled modules, the combination of modules and other devices can include one or more additional devices (e.g., devices 108 and 110) that are communicatively coupled to the modular electronic device 102 over one or more wireless networks 106. The additional devices accessible over the network can include other modular devices (e.g., device 108) and/or non-modular devices (e.g., device 110). Non-modular device 110 can include a smartphone, a tablet computer, a laptop computer, a desktop computer, a smart appliance, an embedded computing device, or other computing devices. Devices can be user controlled, autonomous, or some combination thereof.

The wireless network 106 can be one network (e.g., a Wi-Fi network) or a combination of networks (e.g., a combination of a local area Wi-Fi network, a device-specific personal area network, a piconet, a module-to-module mesh network, etc.). In particular, modules can be capable of communicating with other modules using a wireless communication interface such as RF communication, Near-Field Communication, Bluetooth, Wi-Fi, other wireless communication protocols, or some combination thereof. Thus, modules can be combined logically to perform tasks without a physical connection between the modules. The modular electronic device 100 can be further capable of communicating with one or more physically remote devices 114 (e.g., a server computing device) over a wide area network 112 (e.g., the Internet).

Additional computing devices can enter and depart the ad hoc combination over time. Further, different modules can be owned by different entities in an environment. For example, modules can be part of multiple devices that belong to the same user or to different users. As an example, in a conference room, the video-conference system can offer its modules to users within the room.

In one particular example, a user of the modular electronic device 102 can visit a coffee shop. Additional devices (e.g., devices 108 and 110) can also be located in the coffee shop. For example, the additional devices can include other customers' smartphones, other customers' laptops, a transaction processing device (e.g., "cash register"), or any other computing devices located within the coffee shop or otherwise within range to engage in communications. Thus, as customers enter and leave the coffee shop, their respective devices can join and depart the ad hoc combination of devices available over the network 106. Likewise, as the user of the modular electronic device 102 leaves the coffee shop and visits other locations (e.g., a transit station), the modular electronic device 102 can be exposed to many different ad hoc combinations of devices that are respectively located at such other locations (e.g., the transit station). As will be discussed further below, in some implementations, observations of all of these devices and their associated resources can be used to build and maintain a resource map that provides a description of resources likely to be available at different locations (e.g., the coffee shop and the transit station).

According to aspects of the present disclosure, each module of the device 100 can provide or enable different functionality based on its connection in different device environments. Similarly, if other modular electronic devices (e.g., modular device 108) are communicatively connected over a network, the modules of such devices can each provide or enable their own respective functionalities. Likewise, non-modular devices can provide or enable different functionalities as well.

As an example, the module 104 of the modular device 102 can perform particular tasks when connected to the device 102. For example, the example module 104 can provide processing functionality, memory storage functionality, or other specific functions based on its particular hardware and/or software.

Further, each module can be removed from the modular device 102 and connected in a different environment to perform different tasks. For example, the module 104 can perform particular tasks if it is connected to a different device, or it can be a module in a connected network of modules that can create an ad hoc higher level functionality.

The tasks to be performed by a module or network of modules can be defined in various ways. In some instances, a user can indicate particular tasks. For example, a user can specify particular tasks to perform using available capabilities of the module and other connected modules/devices. In some cases, the module 104 or modular device 102 can output (e.g., display) to the user the capabilities it and other connected modules have available.

In one example, the module 104 of the modular device 102 can be a cellular communication module. The cellular communication module can offer to provide cellular communication capability to a different device (e.g., device 110)

that can lack such capability. In another example, if the modular device 102 has a low battery capacity, it can offload a power-intensive task to another device (e.g., device 110).

In yet further examples, a local or remote server (e.g., device 114) can offer its functionality to devices in a modular manner. For example, a server with high processing capacity can be accessed and used by the module 104 or modular device 102 to carry out processor-intensive tasks.

To enable the ad-hoc combinations described above, modules can be enabled to: discover each other's presence and availability; advertise their own availability, capabilities, and price; negotiate use of other modules' resources; identify tasks that can be suitable for a current environment that includes certain modules; and/or partition tasks such that parts of the task can be performed by the different modules to complete the task. Particular example components for performing these functions will be discussed further below, for example with reference to FIGS. 3 and 7.

In addition, as will be discussed further below, modules and modular devices of the present disclosure can be capable of predicting future availability of module combinations and associated computing resources and/or capable of predicting tasks that need to be performed in the future. For example, module 104 can predict different sets of computing devices and associated resources that will be available to the module 104 or device 102 over time. Based on such predictions, the module 104 or modular electronic device 102 can choose to schedule or delay certain tasks, alter resource negotiation behavior/strategy, or select from among various different resource providers.

Figure 2:
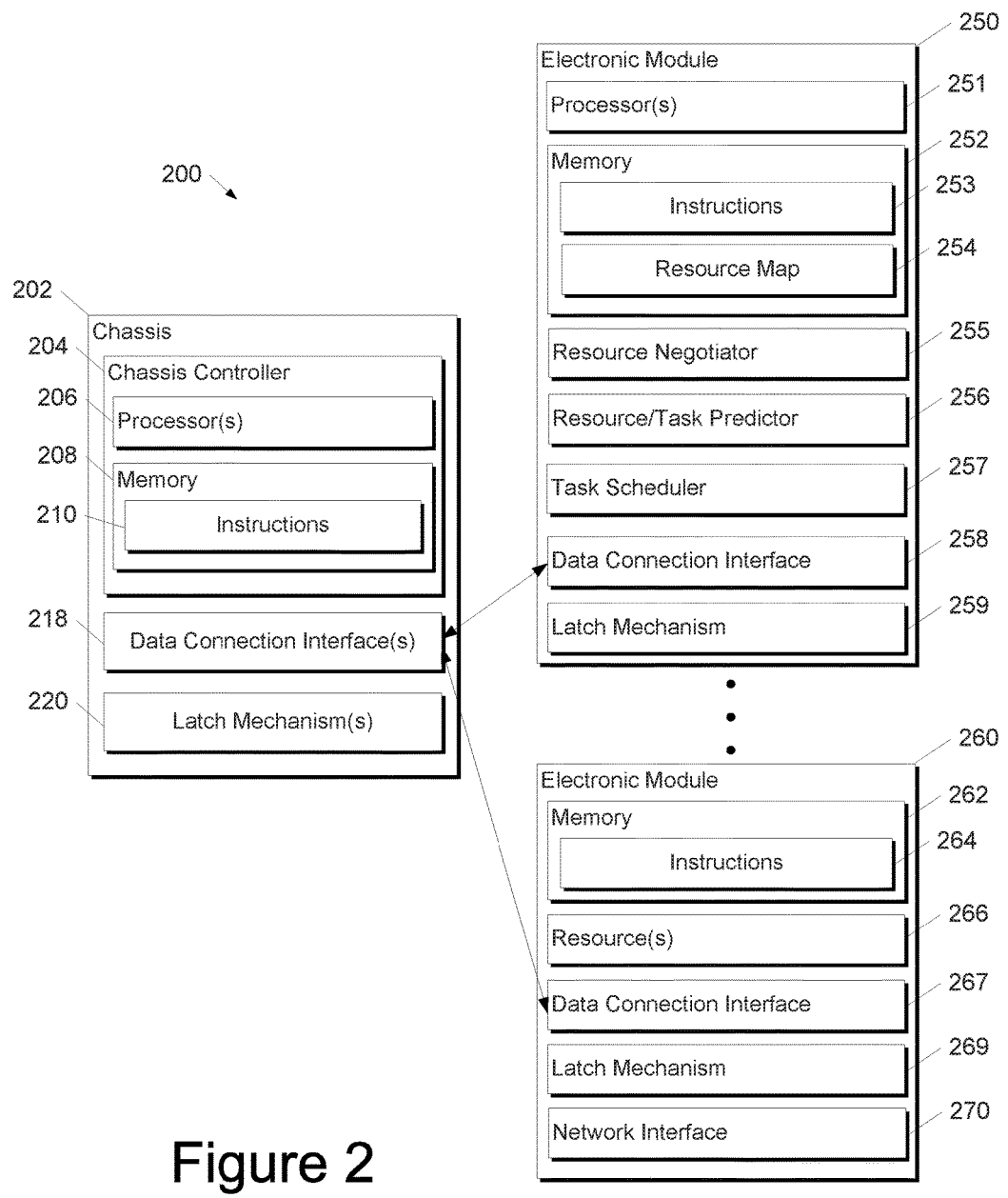
FIG. 2 depicts a block diagram of an example modular electronic device according to example embodiments of the present disclosure.

FIG. 2 depicts a block diagram of an example modular electronic device 200 according to example embodiments of the present disclosure. The example modular electronic device includes a chassis 202 and a plurality of electronic modules. Two representative example electronic modules 250 and 260 are illustrated in FIG. 2 for the purposes of explanation. However, the modular electronic device can have any number of electronic modules. In particular, the number of electronic modules included in the modular electronic device can change over time as modules are swapped in and out of the chassis 202.

Referring specifically to FIG. 2, the chassis 202 can include a chassis controller 202, one or more data connection interfaces 228, and one or more latch mechanisms 220. In some implementations, the chassis 202 can include a frame which has a number of slots or "bays" into which the modules 250 and 260 are removably received. The chassis 202 can serve as an endoskeleton or backbone to provide structure and shape to the modular electronic device 202. For example, the chassis 202 can include a front backplane and a rear backplane with electronic components of the chassis positioned therebetween.

The chassis controller 204 can include one or more processors 206 and a memory 208. Processor 206 of the chassis controller 202 can be any suitable processing device (e.g., microprocessor; microcontroller; ASIC; FPGA; etc.) and can be one processor or a plurality of processors that are operatively connected.

Memory 208 can include any number of non-transitory storage media such as RAM, ROM, flash, EEPROM, EPROM, hard drives, etc. The memory 208 can store processor-executable instructions 210. Execution of the instructions 210 stored in memory 208 by the processor 206 can cause the chassis controller 204 to perform operations consistent with the present disclosure (e.g., provide system-level management of interaction between the electronic modules 250 and 260).

The chassis 202 can also include at least one data connection interface 218 that communicatively couples the plurality of electronic modules to the chassis controller 204. As one example, the chassis 204 can include at least one data connection interface 218 in each of the plurality of slots or bays. The at least one data connection interface 218 can provide bi-directional communications between the chassis controller 204 and the electronic module via one or more electrical, magnetic (e.g., inductive), or optical couplings between the interface 218 and the corresponding module (e.g., with a complementary data connection interface of the electronic module). As an example, the data connection interface 218 of each bay can include a number of complementary pairs of prongs, pins, contacts, or the like to form a number of serial data connections or other forms of data connection. In other implementations, the at least one data connection interface 218 of the chassis 202 can perform wireless communication with one or more of the electronic modules (e.g., according to a short-range wireless communications protocol such as Bluetooth).

The chassis 202 can also include one or more latch mechanisms 220 which serve to selectively retain electronic modules within their respective bays. In some implementations, the chassis 202 includes at least one latch mechanism 220 within each of the plurality of bays. As one example, the latch mechanism 220 within each bay can include an electropermanent magnet included in the chassis. When activated, the electropermanent magnet creates a magnetic field that serves to magnetically hold the electronic module within the bay.

As another example, in some implementations, each bay can include a fixed retention member associated with a wall or surface of the bay and each electronic module can include a release member at least partially housed within the associated module housing that is configured to releaseably engage the retention member. In some implementations, the retention member can correspond to a projection or lip extending outwardly from the floor or bottom surface of the bay and the release member can correspond to an actuatable hook at least partially housed within the module housing. In other implementations, the respective locations and configuration of the retention/release members can be reversed, with the retention member being associated with the electronic module and the release member and electromechanical actuator being associated with the bay.

In some implementations, the chassis 202 further includes one or more buttons on a side of the chassis. For example, the buttons can be the same as or similar to volume control buttons typically seen on mobile computing devices. In yet further implementations, the chassis 202 can include a switch that has at least one component that is temporarily pullable away from the chassis by a user. The pullable component can retract once released by the user. The switch can enable selective release of modules from the chassis 202.

The example electronic module 250 can include one or more processors 251 and a memory 252. Processor 251 of the module 250 can be any suitable processing device (e.g., microprocessor; microcontroller; ASIC; FPGA; etc.) and can be one processor or a plurality of processors that are operatively connected. Memory 252 can include any number of non-transitory storage media such as RAM, ROM, flash, EEPROM, EPROM, hard drives, etc. The memory 252 can store processor-executable instructions 253. Execution of the instructions 253 stored in memory 252 by the processor 251 can cause the module 250 to perform operations consistent with the present disclosure.

In other implementations, the module 250 does not include the processor 251. For example, the module 250 may simply include the instructions 253 stored in memory 252. Another, different module connected to the chassis 202 can include a processor that can load the instructions 253 from the memory 252 and execute the instructions 253. Thus, the modular device 200 can include a number of modules which cooperatively operate to serve as a single device and/or perform desired operations.

In some implementations, the memory 252 further stores a resource map 254. More particularly, according to another aspect of the present disclosure, as advertisements of different devices and associated resources/capabilities are observed by the electronic module 250 over time, a resource map 254 can be built that describes available computing resources at various locations. In the illustrated example, the particular module 250 builds and stores its own map 254 based on its own observations. In some implementations, the resource map 254 can include a time dimension which indicates, for each of various locations, changing availability of resources over time (e.g., versus time of day for each day of the week).

Alternatively or additionally, a similar resource map can be built and/or stored at a central location (e.g., at a server computing device) using observations reported back by many different computing devices and then aggregated. In such implementations, the electronic module 250 can communicate with the server computing device to access the resource map, rather than maintaining its own specific resource map 254.

The electronic module 250 can further include a resource negotiator 255, a resource/task predictor 256, and a task scheduler 257. The electronic module 250 can implement the resource negotiator 255 to negotiate use of other modules' or devices' resources by the electronic module 250 and/or negotiate use of the resources of module 250 by other modules or devices. The electronic module 250 can implement the resource/task predictor 256 to predict future availability of module and/or device combinations and associated computing resources. The electronic module 250 can implement the task scheduler 257 to schedule one or more computing tasks for performance by the module 250 or other devices/modules with which the electronic module 250 is or will be communicatively connected.

The resource/task predictor 256 can analyze various types of data to predict the future sets of computing resources that will be available to the electronic module 250. As an example, the resource/task predictor 256 can receive or otherwise obtain location data associated with the modular electronic device 200 and/or a user of the device 200. The resource/task predictor 256 can predict a destination based at least in part on the location data and can determine a first set of computing resources associated with the destination (e.g., by consulting the resource map 254).

As examples, the location data can include global positioning system data, calendar data that describes one or more future appointment locations, email or messaging data that describes future locations, mapping data that describes one or more locations for which a user has searched, and/or other forms of location data and/or user data. Thus, in some implementations, user information such as location data and/or user data can be analyzed to enable prediction of future computing resources. In some implementations, the user can be provided with controls that allow the user to make an election as to both if and when systems, programs or features described herein can enable collection of such user information (e.g., location data or other user information). However, if the user does not enable collection and use of such user information, the user may not receive the benefits associated therewith as described herein. In addition, certain data can be treated in one or more ways before it is stored or used, so that personally identifiable information is removed. Thus, the user can have control over what information is collected about the user, how that information is used, and what information is provided to the user.

In some implementations, the resource/task predictor 256 can predict future resource availability by identifying one or more location patterns exhibited by location data that describes a historical location of the electronic module 250 and/or a user of the electronic module 250. Based on such location patterns, the resource/task predictor 256 can predict the one or more future sets of computing resources that will be respectively available to the electronic module 250 at the one or more future time periods.

In some implementations, the resource/task predictor 256 can predict future resource availability by accessing the resource map 254. The resource/task predictor 256 can use the resource map 254 and one or more predicted future locations to determine the one or more future sets of computing resources that are expected to be available to the module 250.

In some implementations, the electronic module 250 can also implement the resource/task predictor 256 to predict tasks that will be requested to be performed in the future. For example, the resource/task predictor 256 can predict future tasks by identifying patterns of tasks requested by a user or otherwise performed by the electronic module 250 in the past.

In some implementations, the resource negotiator 255 can implement a sense protocol which enables module 250 and other modules/devices to discover each other's presence and availability and advertise their own respective availability, capabilities, and price. Negotiations can result in agreed upon costs or other exchanges to compensate for use of the resources of other modules/devices.

In some implementations, the task scheduler 257 can schedule tasks based on one or more predictions made by the resource/task predictor 256 regarding future resource availability and/or future task requests. For example, the task scheduler 257 can leverage the one or more predictions made by the resource/task predictor 256 regarding future resource availability and/or future task requests to determine a schedule which achieves performance of all tasks within a designated time period.

As another example, the resource negotiator 255 and/or the task scheduler 257 can use predictions regarding future resource availability made by the resource/task predictor 256 to guide selection of the module or device from which resources are negotiated and received. For example, the resource/task predictor 256 can predict that a particular module from which the electronic module 250 is receiving resources is about to become unavailable. The task scheduler 257 can reassign the task to use resources from one or more other modules that are predicted to remain available longer. The resource negotiator 255 can then negotiate such reassignment.

According to another aspect of the present disclosure, the resource/task predictor 256 can also predict one or more expected costs respectively associated with performance of a particular computing task by one or more future sets of computing resources that are predicted to be respectively available to the module 250 at one or more future time periods. The resource/task predictor 256 can predict the costs based on previous negotiations and/or previous observations of advertisements from such resource-providing modules or devices. In some implementations, the resource map 254 can also include cost information, whether previously observed or predicted.

In some implementations, the resource negotiator 255 can engage in negotiations for resources from other modules/devices based on predictions regarding future resource availability made by the resource/task predictor 256. In particular, the resource negotiator 255 can perform negotiations for resources (e.g., either as resource-requestor or resource-provider) based on expected costs associated with predicted future sets of computing resources.

As an example, the resource negotiator 255 can offer a particular price to a currently available module or device to perform a particular task, where the particular price is a function of an expected cost associated with a resource of a device predicted to be available in the future and a determined probability that such resource will, in fact, be available in the future (e.g., in the future and prior to a deadline associated with the particular task). Other negotiating schemes can be used as well which leverage prediction of future resource availability and/or prediction of future resource cost to assist in setting negotiation limits, offers, or other values.

Likewise, the task scheduler 257 can determine a schedule for performance of the one or more computing tasks based at least in part on the one or more expected costs predicted by the resource/task predictor 256. For example, the task scheduler 257 can determine a schedule which minimizes expected cost of having the computing tasks performed.

Thus, the task scheduler 257 can use predictions of future sets of computing resources to more efficiently schedule performance of computing tasks. The computing tasks can be currently requested computing tasks or can be future computing tasks that the resource/task predictor 256 has predicted will be requested.

Each of the resource negotiator 255, the resource/task predictor 256, and the task scheduler 257 include computer logic utilized to provide desired functionality. Thus, each of the resource negotiator 255, the resource/task predictor 256, and the task scheduler 257 can be implemented in hardware, application specific circuits, firmware and/or software controlling a general purpose processor. In one embodiment, each of the resource negotiator 255, the resource/task predictor 256, and the task scheduler 257 are program code files stored on the storage device, loaded into memory and executed by a processor or can be provided from computer program products, for example computer executable instructions, that are stored in a tangible computer-readable storage medium such as RAM, hard disk or optical or magnetic media. The resource negotiator 255, the resource/task predictor 256, and the task scheduler 257 can each correspond to one or more different programs, files, circuits, or sets of instructions. Likewise, two or more the resource negotiator 255, the resource/task predictor 256, and the task scheduler 257 can be combined into a single program, file, circuit, or set of instructions.

In some implementations, one or more of the resource negotiator 255, the resource/task predictor 256, and the task scheduler 257 are included within a sense unit of the electronic module 250. For example, the resource negotiator 255 can be included within a sense unit of the electronic module 250 or vice versa. In some implementations, one or more of the resource negotiator 255, the resource/task predictor 256, and the task scheduler 257 are included within a task manager or tasklet manager of the electronic module 250. For example, the resource/task predictor 256 and/or the task scheduler 257 can be included within a tasklet manager of the electronic module 250, or vice versa.

The electronic module 250 can further include a data connection interface 258 and a latch mechanism 259. In some implementations, the data connection interface 258 is the same as, similar to, or complementary to the data connection interface 218 described above. For example, the data connection interface 258 can include a number of prongs, pins, or other electrical connections that are designed to mate with complementary connections at the data connection interface 218. In some implementations, the latch mechanism 259 is the same as, similar to, or complementary to the latch mechanism 220 discussed above.

The example electronic module 260 can include many of the same components as the electronic module 250: such as a memory 262 that stores instructions 264; a data connection interface 267; and a latch mechanism 269.

Further, the electronic module 260 can include components that are distinct from those included in the module 250. Such can enable the module 260 to provide or offer services or functionality that is different than that provided by the module 250. For example, the electronic module 260 can include any number of components that provide various resources 266. For example, the resources 266 can be general resources such as processing power, storage capability, or communication bandwidth, or can be specialized resources, including, for example, specialized hardware such as a camera, a graphics processing unit, a blood pressure monitor, a fingerprint scanner, a flashlight, a speaker, etc.

As one example resources, the module 260 includes a network interface 270. The network interface 270 can include any components or configuration suitable for communication over one or more networks, including, for example, one or more ports, transmitters, wireless cards, controllers, physical layer components, or other items for communication according to any currently known or future developed communications protocol or technology. Thus, as an example, module 260 can negotiate to provide module 250 with use of its network interface 270 to communicate with other modules or devices over one or more network.

Furthermore, the modular electronic device 200 illustrated in FIG. 2 is provided as one example only. Modular electronic devices of the present disclosure can have many designs that are different or alternative to the modular electronic device 200 of FIG. 2. For example, certain modular electronic devices may not have a chassis 202, but rather consist solely of modules that are physically coupled to each other.

According to another aspect of the present disclosure, to enable provision of functionality by different modules and local or remote devices or servers to each other, modules can include functions to advertise their presence and capabilities to other devices/modules. Modules can also detect other modules that are available and their associated capabilities. In some implementations, a module can include one or more sense units which are used for such communications.

Figure 3:
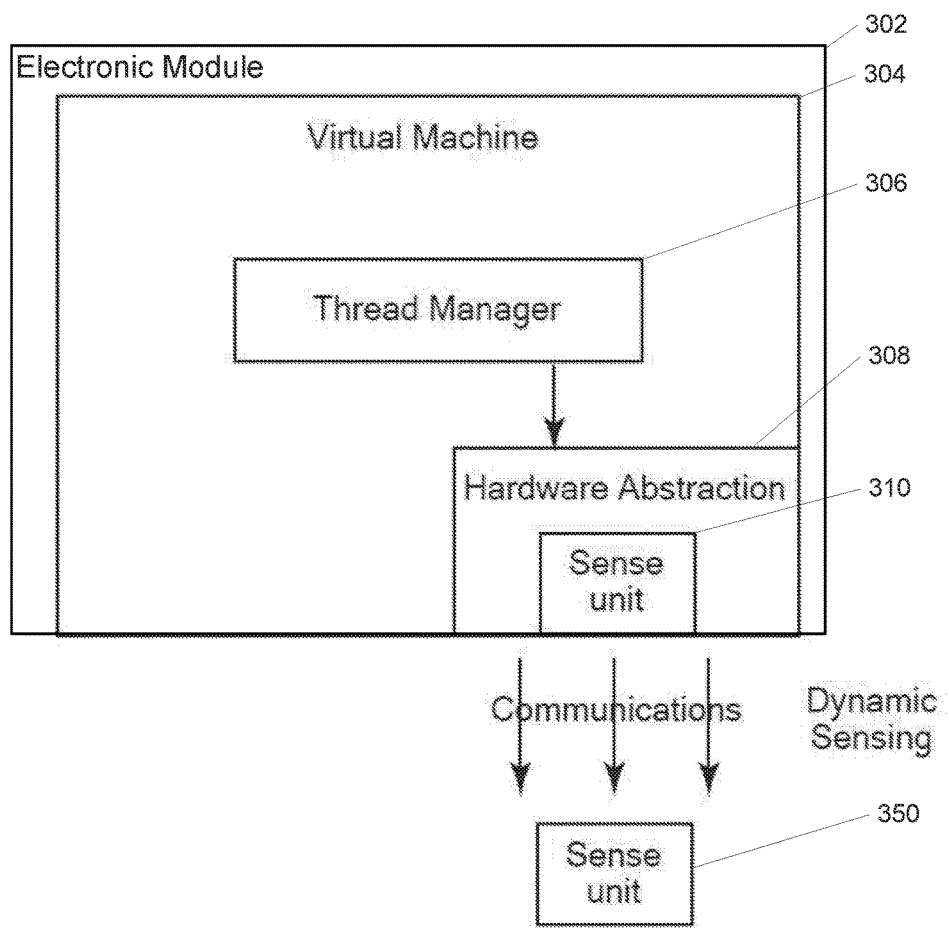
FIG. 3 depicts a block diagram of an example module according to example embodiments of the present disclosure.

In particular, FIG. 3 depicts a block diagram of an example electronic module 302 according to example embodiments of the present disclosure. The electronic module 302 includes a virtual machine 304 running on the module 302 that can, for example, evaluate the capabilities of the module. The virtual machine 304 can also coordinate the communication and use of capabilities between the module 302 and other modules/devices. For example, the virtual machine 304 can determine if needed capabilities for a task are not available on the module and determine how to obtain or perform those capabilities, e.g., by connecting with other modules, server devices, etc. and obtaining needed resources.

In some implementations, the module 302 implements the virtual machine by executing, with a processor, instructions stored in a memory. In other implementations of the present disclosure, modules can perform the above described functions without using a virtual machine.

In the example module 302 of FIG. 3, the virtual machine 304 includes a thread manager 306 to manage operations of the virtual machine 304. The thread manager 306 can oversee and distribute different threads. For example, threads can include tasks that are to be performed by the module. The thread manager 306 can interface with a hardware abstraction layer 308. The hardware abstraction layer 308 can include a sense unit 310.

Each of the thread manager 306 and the sense unit 310 include computer logic utilized to provide desired functionality. Thus, each of the thread manager 306 and the sense unit 310 can be implemented in hardware, application specific circuits, firmware and/or software controlling a general purpose processor. In one embodiment, each of the thread manager 306 and the sense unit 310 are program code files stored on the storage device, loaded into memory and executed by a processor or can be provided from computer program products, for example computer executable instructions, that are stored in a tangible computer-readable storage medium such as RAM, hard disk or optical or magnetic media.

According to an aspect of the present disclosure, the sense unit 310 can be configured to monitor and determine current statuses and capabilities of the module 302. The sense unit 310 can also configured to communicate with other, corresponding sense units (e.g., sense unit 350) outside the virtual machine 304, including, for example, sense units in other modules or devices. For example, a sense unit (e.g., units 310 and 350) can be a small component provided on various modules intended to use described features.

The sense unit 310 can advertise a capability of the module 302. The sense unit 310 can communicate with other sense units (e.g., unit 350) outside the virtual machine 304 through various available communication modalities. For example, the sense unit 310 can use Near-Field Communications (NFC), Bluetooth, or other short range wireless protocols for such communication.

In some instances, where the sense unit 310 is part of a module 302 that itself is part of a modular device that includes other modules, the sense unit 310 can communicate with other sense units using inter-process communication (IPC) within the device (e.g., by way of one or more data connection interfaces). In other instances, the sense unit 310 can communicate with remote sense units (e.g., sense units at a remote server) over a wide area network (e.g., the Internet). In some cases, the sense unit 310 can utilize a physical connection, such as, for example, a connection over a port (e.g., USB), a wired network interface, a proprietary interface, or physical connections to communicate with other sense units.

The sense unit 310 can be capable of identifying other sense units that correspond to modules of the same or similar type. In some examples, similar modules can determine that a connection between the modules is secure.

According to another aspect of the present disclosure, a module can advertise its presence and capabilities. In particular, in the example module 302 illustrated in FIG. 3, the sense unit 350 can advertise or describe the functionality of the module 302. In some implementations, the sense unit 310 of the module 302 can broadcast information listing one or more capabilities of the module. For example, such broadcast can be periodic, or triggered by certain conditions. In other implementations, the sense unit 310 can advertise only the presence of the module 302, and can receive and respond to requests to describe capabilities of the module 302.

In one example simple protocol, the module 302 can advertise its general functionality. For example, the advertised information can include an available processing power, a memory/storage capability, a communication bandwidth, or other information concerning the module 302.

In other examples, specialized modules can advertise specific or specialized functionality. For example, specialized functionality can include the ability to capture images with a certain quality, the ability to efficiently implement a mathematical function such as a Fourier transform or a cryptographic function, or other specialized functions.

In some example protocols, modules can also advertise additional details about their capabilities. For example, the module 302 can advertise its communication capabilities in terms of distance, protocol or speed of which the module is capable. As examples, an advertisement can indicate the following information: "Bluetooth, up to 20 m, at a rate of X kbps"; "cellular, long-distance capable, at a rate of Y mbps"; etc.

In some example protocols, modules can similarly describe their processing functionality in more detail. For example, advertisements can include information about the module's ability to process a standard task within a period of time. For example, modules can describe memory capabilities in terms of permanent and/or non-permanent storage, amount of storage available, speed of storage, etc. The module can also describe other capabilities such as power availability, guest mode and/or user authorization, security and/or privacy settings, etc.

In some instances, module 302 can be capable of performing certain software operations and module 302 can advertise these software operations. For example, module 302 can be capable of and advertise its ability to transcode a video stream, render a 3-D animation based on input data, etc.

In some implementations, module 302 can selectively enable discovery of use-case specific software applications that might be of interest to other modules. For example, if module 302 detects an advertised request from a second module for a particular application, module 302 can, in response, start advertising its capability of providing functions of that application.

According to another aspect of the present disclosure, the module 302 can advertise its availability and price. For example, module 302 can also advertise its availability in terms of available time or duration and/or available units of capability. Units of capability can be standardized. Module 302 can further advertise a price for utilization of its capabilities. In some examples, module 302 can charge different prices for different types of tasks, e.g., different prices for interruptible and non-interruptible tasks. Accounts can be associated with various modules or devices. Prices or other costs to be assessed against such accounts in exchange for use of resources or other task performance.

In some implementations, the module 302 can dynamically update its advertised availability and price based on a changing environment of connected modules and tasks. For example, existing tasks can be completed and new tasks initiated, creating different demands for capabilities of the module 302 in a module network. In another example, one or more modules can be brought into or removed from a module network (e.g., based on communication range), thus changing the availability of resources and potentially changing the price of offered capabilities. In another example, module 302 can periodically broadcast different availability/price based on utilization of the module's resources by other modules.

According to another aspect of the present disclosure, module 302 can accept tasks to perform. In particular, module 302 can receive multiple requests from other modules to utilize its capabilities. Requests can include parameters such as a time duration for which the capabilities of the module 302 are required, whether the task is interruptible, a price that the requester is offering, a Quality-of-Service requirement, and other parameters. The module 302 can, based on the incoming requests and local information, accept one or more of the requests. The requests can be accepted in a particular order or in parallel. The module 302 can have one or more budgets (e.g., a computing budget, a power budget, a memory budget, etc.) and can refuse requests that exceed one or more of such budgets.

In one example, the module 302 is part of video-conferencing hardware and includes a many-core graphics processing unit ("GPU"). The module 302 can have local information regarding reservations or demand for the video-conferencing hardware. Based on this information, the module 302 can advertise availability of its capabilities at certain times, for example, at a time when no video-conference is scheduled.

Further, the module 302 can be capable of performing multiple incoming tasks in parallel (e.g., using different subset cores of a many-core GPU). In this example, the module 302 can accept a single request to use the entire GPU or a combination of requests that together utilize the GPU. Further, the module 302 can predict a future demand (e.g., based on historical usage) and reserve its resources based on such predicted future demand.

The module 302 can perform a negotiation with a requester through its sense unit using a sense protocol. For example, the module 302 can make itself available in discrete chunks of time and permit a requester to make reservations. Further, the negotiation can permit a requester to specify whether a task is non-priority (e.g., a background processing task). In this example, the module 302 can offer a lower price (e.g., corresponding to relaxed performance requirement) to the requester.

In some implementations, the module 302 can be capable of serving only one requester at a time. In such implementations, the module 302 can choose one of the incoming requests, for example, based on the offered price, time duration, or other parameters associated with the request.

Thus, the module 302 is capable (e.g., by way of the sense unit 310), of discovering the presence and availability of other modules or devices and is capable of advertising its own availability, capabilities, and price. The module 302 can negotiate use of other modules' resources, identify tasks suitable for a current module network environment, and assign tasks using resources of different modules to complete the tasks. Particular examples of the above-described principles and functions will now be discussed in further detail.

Example Usage Scenarios

Figure 4:
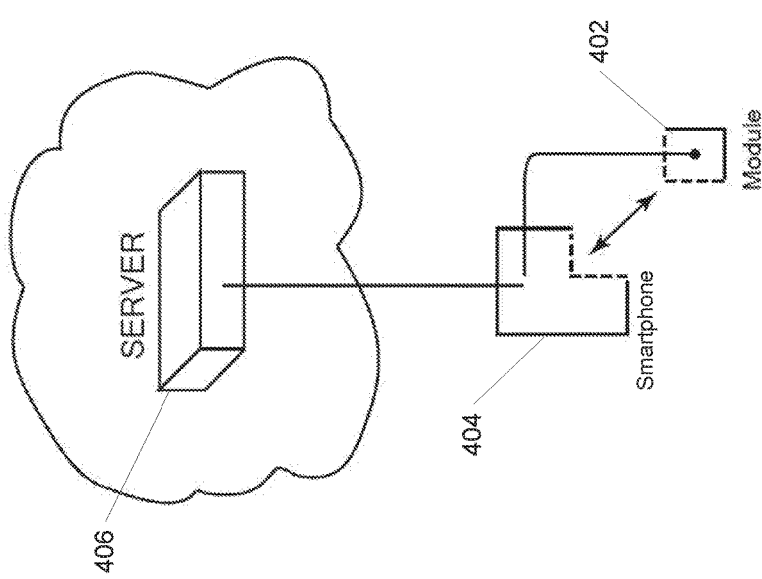
FIG. 4 depicts a block diagram of an example module in communication with an example smartphone according to example embodiments of the present disclosure.

In a first example scenario, a module can connect to a server through a smartphone. As an example, FIG. 4 depicts a block diagram of a module 402 in communication with a smartphone 404, which in turn is in communication with a server 406. The smartphone 404 may or may not be modular in nature. The smartphone 404 is provided as an example computing device. Other computing devices can be used in place of the smartphone 404 (e.g., a laptop computer or another module).

In the example illustrated in FIG. 4, the module 402 may be capable only of short-range wireless communication. Thus, in the illustrated example, the module 402 may be capable of communicating only with the smartphone 404 because the smartphone 404 is the only device within communication range of the module 402.

A sense unit or other component of the module 402 can discover one or more capabilities offered by or through the smartphone 404. Some capabilities can be offered directly by the smartphone 404. For example, the capabilities can be accessed from another physically connected module of the phone. As another example, some resources or capabilities can be offered by the server 406 that is communicatively connected to the smartphone 404. The server 406 can be a remote server or a local server. The smartphone 404 (e.g., a sense unit of the smartphone 404) can relay information regarding these resources to the module 402 or other devices.

In some implementations, the module 402 can detect the available resources offered by the smartphone 404 and choose a task to be performed. In some implementations, the sense unit or other component of the module 402 can communicate a requirement (e.g., for a particular resource such as a processor) to the smartphone 404 and request the smartphone 404 to obtain such a capability (e.g., through the server 406). The phone 404 can in turn relay such a request to the server 406 and if the resources are available, relay the availability to the module 402. Such communication can proceed through multiple hops between the module 402 and the server 406.

Figure 5:
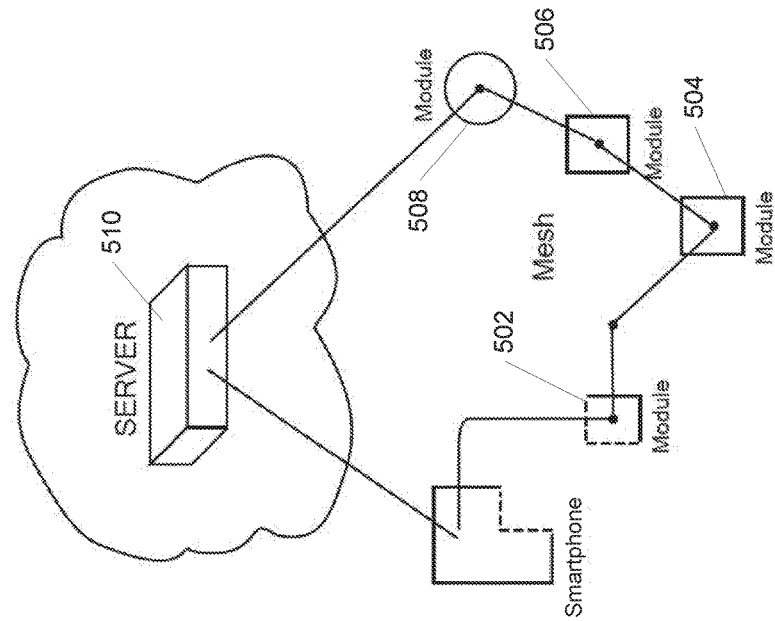
FIG. 5 depicts a block diagram of an example module connected to other modules through a mesh network according to example embodiments of the present disclosure.

In a second example scenario, a module can connect to other modules in a mesh network and to a server through a smartphone. As an example, FIG. 5 shows a module 502 similar to module 402 of FIG. 4. The module 502 of FIG. 5 can be additionally capable of communicating with one or more other modules 504, 506, and 508. For example, the modules 502-508 can communicate through a mesh network, as illustrated. The other modules 504-508 of the mesh network can each offer capabilities (e.g., resources) and can relay requests to and from the module 502, including, for example, to a server 510. The module 502 can select from the available resources, for example, based on a sense protocol as described above.

Figure 6:
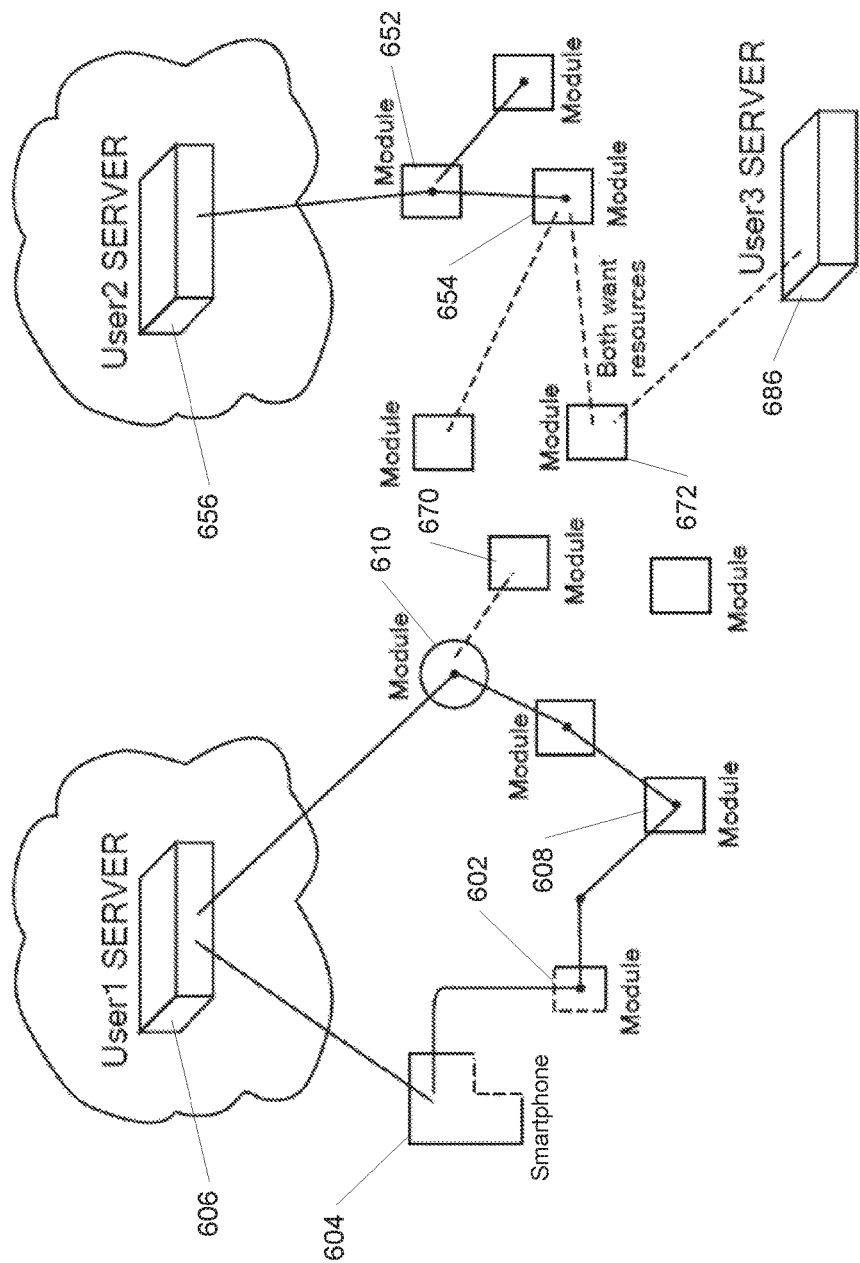
FIG. 6 depicts a block diagram of example modules and mesh networks associated with specific users according to example embodiments of the present disclosure.

In a third example scenario, modules and mesh networks can be associated with specific users. As an example, FIG. 6 shows a smartphone 604 in communication with a "User1 server" 606. For example, the phone 604 can be part of a mesh network including a module 602 associated with a user named "User1." Further, the mesh network can include other modules, (e.g., modules 608 and 610) that are part of one or more devices associated with User1. The mesh network associated with the User1 server 606 is shown having modules connected with solid lines to each other and to the User1 server 606.

Similarly, a second mesh network can be associated with a user named "User2," including a User2 server 656 and modules associated with User2 (e.g., module 652 and 654 and other modules connected to User2 server 656 with solid lines). A module of this mesh network can discover and use resources from the other modules or server of the mesh network to perform tasks.

Modules of a mesh network can also communicate with modules of a different mesh network or other modules that can be available. For example, the other modules can be within a particular communication range of the module. In FIG. 6, particular modules of the mesh networks have communicated with other modules within communication range, (e.g., module 670 and 672 and other modules shown in dashed lines). The other modules can be part of their own mesh networks. Multiple user mesh networks can communicate with each other to form larger mesh networks.

In this example, a third user named "User3" that is associated with a server "User3 server" 686 can enter the communication range, (e.g., with a device acting as User3 server 686). The User3 server 686 can communicate with and connect to other modules and mesh networks. The User3 server 686 can receive information about resources available on the mesh network. The User3 server 686 can request a resource from the mesh network.

For example, the User3 server 686 can request a resource from the module 672. If the requested resource of the module 672 is already in use, for example, by the User2 module 654 as shown, the sense protocol of one or more of the involved devices can enable a negotiation. For example, the User3 server 686 can offer a higher price for use of the resource of module 672 than the price to which User2 module 654 initially negotiated. As a result of the negotiation, the User2 module 654 can relinquish the resource of module 672, or the resource of module 672 can accept a request from User3 server 686. Thus, in the above example, there can be competition for resources advertised within the mesh network and the sense protocol can enable negotiation for optimal resource allocation.

Figure 7:
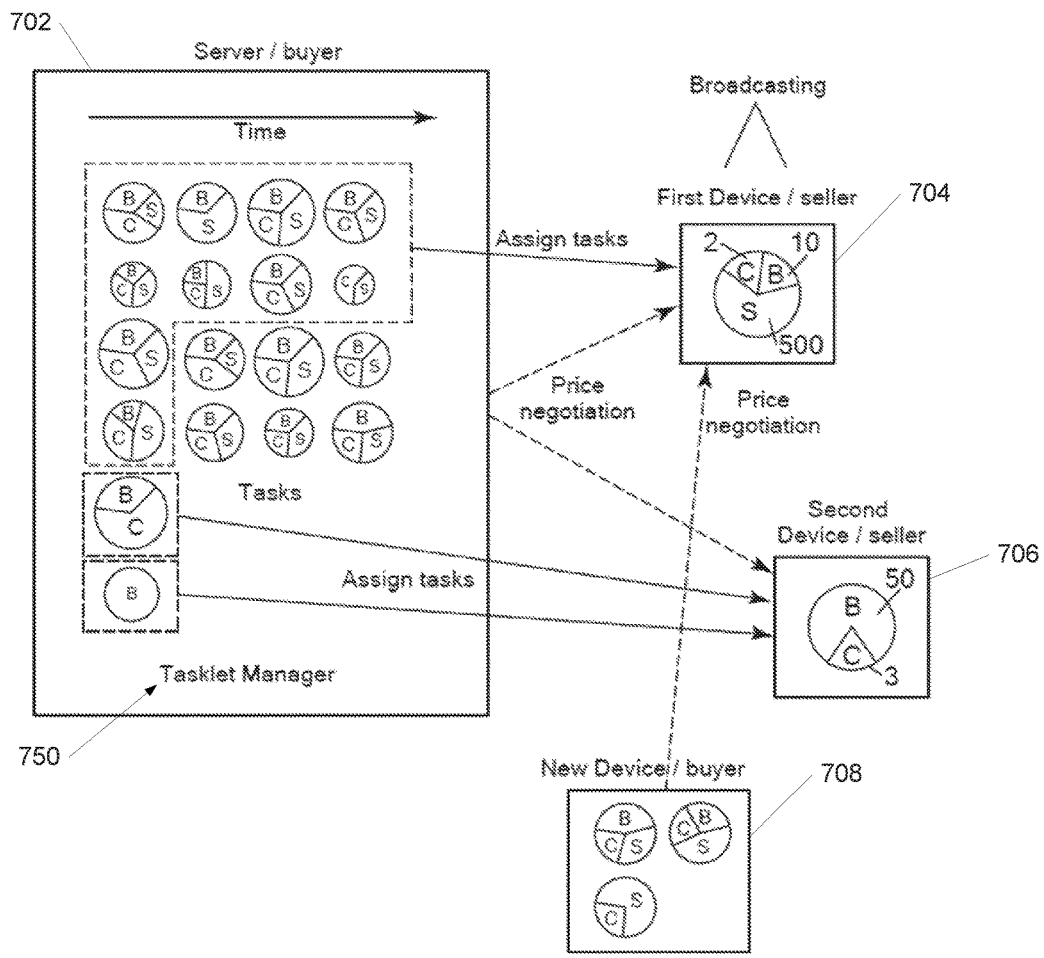
FIG. 7 depicts a block diagram of a central server or local coordinator performing task breakdown and allocation according to example embodiments of the present disclosure.

According to another aspect of the present disclosure, in some implementations, a central server or local coordinator can perform task breakdown and allocation. As an example, FIG. 7 shows an example of task breakdown and allocation by a server 702 among communicating devices 704, 706, and 708. In FIG. 7, the server/buyer 702 can be a module or other device (e.g., modular device or non-modular device) that has one or more tasks to perform at a given time. In other implementations, the server/buyer 702 can be a non-server module or other device. The server/buyer 702 can be part of a communication network (e.g., an ad hoc mesh network) and can be capable of communicating with one or more devices such as devices 704 and 706. The device/sellers 704-706 can be modules or other devices able to communicate with the server/buyer 702 and each other.

The server/buyer 702 can have one or more tasks that it needs to complete. Such tasks can require resources that may not be available within the server 702. In some implementations, a sense unit of the server/buyer 702 can broadcast requests for particular resources that other devices in range can receive. The sense unit of the server/buyer 702 can receive information from other devices regarding different resources available in the mesh network.

For example, a simple sense protocol can enable each device/seller 704 and 706 to advertise its respective capabilities in terms of their available communication bandwidth B (e.g., to other devices), computing capability C, and storage capability S. The sense protocol can specify that the B-C-S capabilities be described in terms of standard units. In one example, a standard unit for compute capability can be millions of instructions per second ("MIPS").

In the example shown in FIG. 7, a first device/seller 704 advertises that it has 10 units of bandwidth, 2 units of computing, and 500 units of storage capability. A second device/seller 706 advertises that it has no storage capability, but has 50 bandwidth and 3 units of computing capability. Further, the sense protocol can enable each device/seller to advertise other parameters such as price for utilization of its resources and a time (or time range) of availability for the resources. For example, a sense unit of a device/seller can transmit or broadcast a tuple {B,C,S; price; time} that includes such information. The transmitted information can change periodically, for example, based on utilization of each device/seller. A more advanced sense protocol can permit the device/seller to specify future prices and units of availability based on predictions of future task needs, for example, after particular tasks complete, new tasks start, etc.

The server/buyer can include a "tasklet manager" 750. The tasklet manager 750 can divide or partition a task into one or more "tasklets." A tasklet can be a small, well-defined unit of work for the task. For example, a tasklet can specify a mathematical operation (or set of operations) to be performed on certain data. In another example, a tasklet can be to communicate an amount of data to a remote server. In yet another example, a tasklet can be to store an amount of data.

A tasklet can specify the resource requirement for a particular amount of time and/or a communication requirement (e.g., bandwidth or physical distance). A tasklet can be interruptible or non-interruptible, for example, based on priority or importance of the tasklet.

A tasklet can require a defined set of resources. The resource requirements for each tasklet can be defined in terms of the bandwidth, compute and storage (B,C,S) and/or other parameters required for the tasklet. In FIG. 7, different illustrated sizes of tasklets can indicate different amounts of resources required to perform those tasklets.

In some implementations, the tasklet manager 750 of the server/buyer 702 can perform the breakdown of tasks based on information received by a sense unit of the server/buyer 702 about available resources (e.g., from each device/seller 704 and 706). For example, the tasklet manager 750 can generate tasklets that are matched to capabilities of the available device/sellers and that efficiently aggregate the capabilities.

The tasklet manager 750 can identify multiple resources that are capable of performing a tasklet and choose among them. For example, two different device/sellers can offer similar compute and bandwidth capability. However, one of the two devices can support a low-power communication protocol. In this example, the tasklet manager 750 can assign the tasklet to the device that supports the low-power communication protocol.

In some examples, the tasklet manager 750 can perform task breakdown independent of the information received by the sense unit. In some examples, the tasklets can be generated before information about resources (e.g., from device/sellers 704 and 706) is available.

The sense protocol can be implemented to permit a price negotiation for resources between the server/buyer 702 and each device/seller 704 and 706, as indicated in FIG. 7. Based on the negotiation, a tasklet can be assigned to a particular device/seller. In some cases, resources required for tasklets can be obtained from multiple devices. In this manner, the server/buyer 702 can complete the task by utilizing resources respectively from the device/sellers 704 and 706.

In the example shown in FIG. 7, a new device/buyer 708 can join the mesh network. Devices in the mesh network can relay capabilities (e.g., resources) offered by the devices and available to the new device/buyer 708. The new device/buyer 708 can engage in price negotiation with a device/seller. For example, in FIG. 7, the new device/buyer engages in price negotiation with the first device/seller 704 and competes with the server/buyer 702 for some resources of the first device/seller 704. In response, the first device/seller 704 can complete a tasklet for the server/buyer 702 and switch to performing a tasklet for the new device/buyer 708, for example, if a price offered by the new device/buyer 708 is higher than that offered by the server/buyer 702.

While the server/buyer 702 and device/seller 704 are shown as different entities, it will be understood that any device or module can act as a buyer or seller, at different times, or simultaneously. For example, a device with excess compute capability and no communication capability can offer compute resources, while simultaneously consuming bandwidth capability from a different device.

In some implementations, a device/seller can accept an incoming resource request on a first-in-first-out basis. In these implementations, there may not be a negotiation.

In other implementations, there may not be a central "tasklet manager." For example, the task can be a standard operation and can specify pre-defined tasklets. In such examples, distributed coordination between different modules can be utilized to complete the task.

In some implementations, the tasklet manager 750 includes computer logic utilized to provide desired functionality. Thus, the tasklet manager 750 can be implemented in hardware, application specific circuits, firmware and/or software controlling a general purpose processor. In one embodiment, the tasklet manager 750 includes program code files stored on the storage device, loaded into memory and executed by a processor or can be provided from computer program products, for example computer executable instructions, that are stored in a tangible computer-readable storage medium such as RAM, hard disk or optical or magnetic media.

Example Methods

Figure 8:
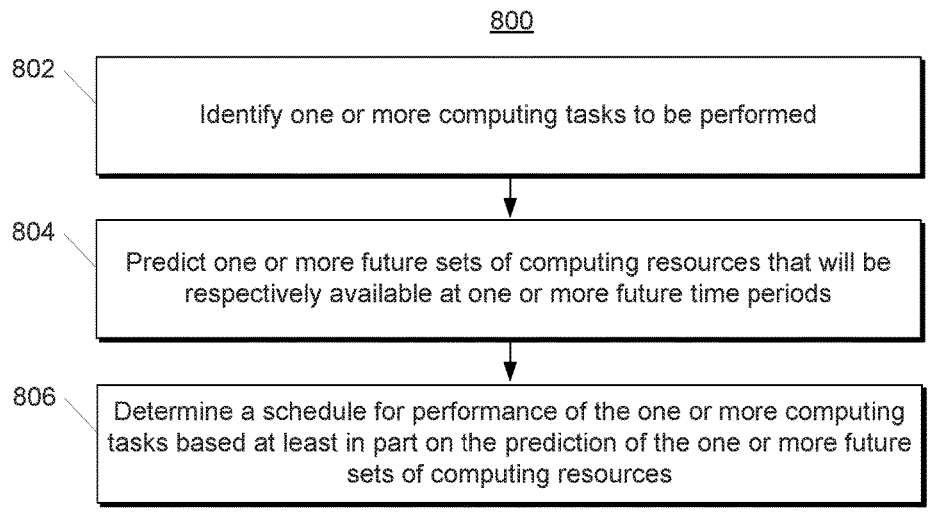
FIG. 8 depicts a flow chart diagram of an example method for scheduling task performance based on prediction of future capabilities according to example embodiments of the present disclosure.

FIG. 8 depicts a flow chart diagram of an example method 800 for scheduling task performance based on prediction of future capabilities according to example embodiments of the present disclosure. Although method 800 will be discussed with reference to an example modular electronic device, example method 800 can be performed a non-modular device as well.

At 802, a modular electronic device identifies one or more computing tasks to be performed. For example, the computing tasks can be processing tasks, storage tasks, communication tasks, etc. The modular electronic device can include one or more modules.

In some implementations, identifying the one or more computing tasks to be performed at 802 can include predicting at least a first computing task that will be requested to be performed in the future.

At 804, the modular electronic device predicts one or more future sets of computing resources that will be respectively available at one or more future time periods. For example, in some implementations, the modular electronic can perform example method 900 of FIG. 9 to predict the one or more future sets of computing resources.

At 806, the modular electronic device determines a schedule for performance of the one or more computing tasks based at least in part on the prediction of the one or more future sets of computing resources. The schedule can conform to any deadlines or other constraints associated with the computing tasks.

As an example, in some implementations, determining the schedule at 806 can include determining whether to perform a first computing task of the one or more computing tasks with a current set of computing resources during a current time period or to schedule the first computing task for performance by one of the future sets of computing resources in one of the future time periods.

For example, in some implementations, determining whether to perform the first computing task of the one or more computing tasks with the current set of computing resources during a current time period or to schedule the first computing task for performance by one of the future sets of computing resources in one of the future time periods can include determining that the current set of computing resources is capable of performing the first computing task and determining that at least one of the future sets of computing resources is incapable of performing the first computing task. In response, the modular electronic device can cause performance of the first computing task by the current set of computing resources during the current time period.

Figure 9:
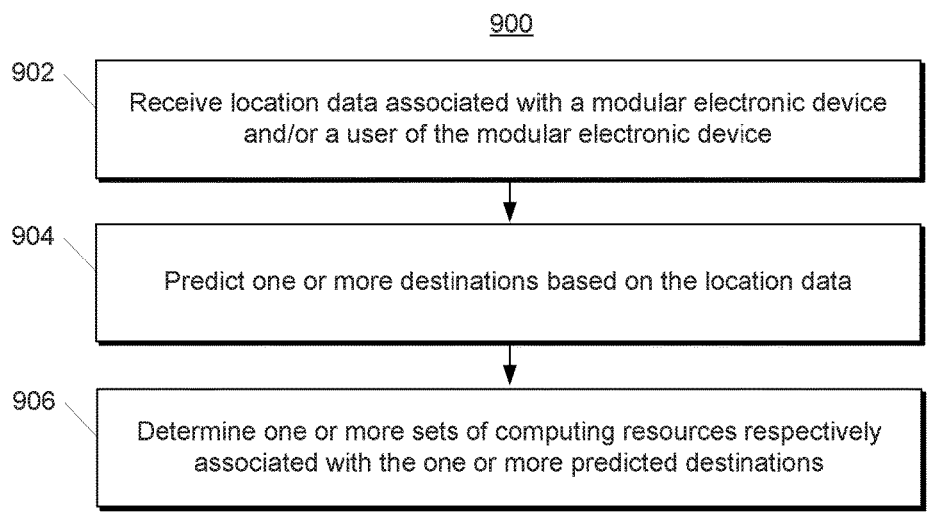
FIG. 9 depicts a flow chart diagram of an example method for predicting one or more future sets of computing resources according to example embodiments of the present disclosure.

FIG. 9 depicts a flow chart diagram of an example method 900 for predicting one or more future sets of computing resources according to example embodiments of the present disclosure. Although method 900 will be discussed with reference to an example modular electronic device, example method 900 can be performed by a non-modular device instead.

At 902, a modular electronic device receives location data associated with the modular electronic device and/or a user of the modular electronic device. For example, receiving location data at 902 can include receiving at least one of: global positioning system data, calendar data that describes one or more future appointment locations, and mapping data that describes one or more locations for which a user has searched.

At 904, the modular electronic device predicts one or more destinations based on the location data. As an example, in some implementations, predicting the one or more destinations at 904 can include identifying one or more location patterns exhibited by the location data and predicting, by the modular electronic device, the one or more future sets of computing resources that will be respectively available to the modular electronic device at the one or more future time periods based at least in part on the identified one or more location patterns.

At 906, the modular electronic device determines one or more sets of computing resources respectively associated with the one or more predicted destinations. As an example, in some implementations, determining the sets of computing resources at 906 can include accessing a map that describes available computing resources at various locations and determining the one or more future sets of computing resources based at least in part on the resources described for the one or more locations predicted at 904. The predicted resources can be available over an ad hoc network and/or provided by other modules of other modular electronic devices.

Figure 10:
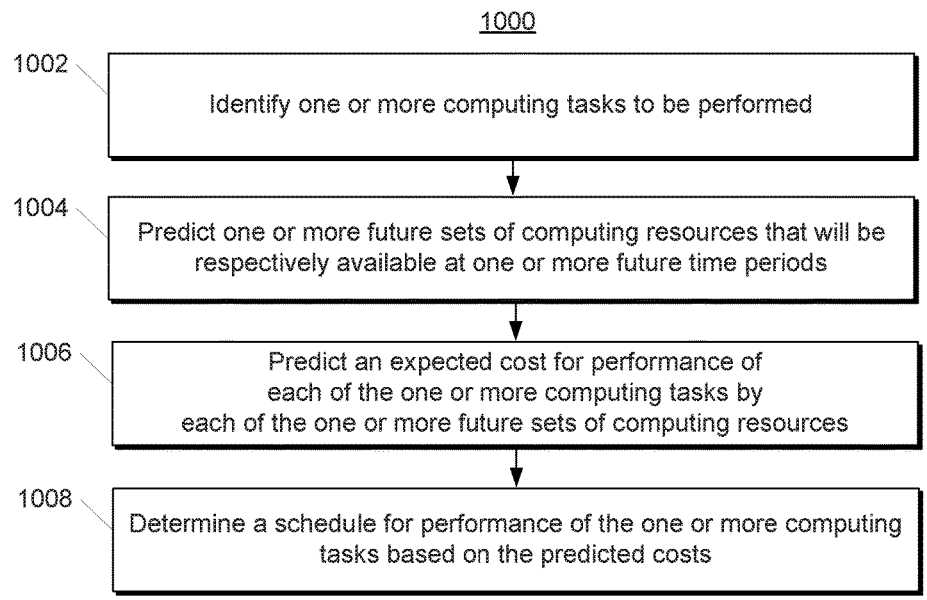
FIG. 10 depicts a flow chart diagram of an example method for scheduling task performance based on prediction of future capabilities and associated expected costs according to example embodiments of the present disclosure.

FIG. 10 depicts a flow chart diagram of an example method 1000 for scheduling task performance based on prediction of future capabilities and associated expected costs according to example embodiments of the present disclosure. Although method 1000 will be discussed with reference to an example modular electronic device, example method 1000 can be performed by a non-modular device instead.

At 1002, a modular electronic device identifies one or more computing tasks to be performed. For example, the computing tasks can be processing tasks, storage tasks, communication tasks, etc. The modular electronic device can include one or more modules.

In some implementations, identifying the one or more computing tasks to be performed at 1002 can include predicting at least a first computing task that will be requested to be performed in the future.

At 1004, the modular electronic device predicts one or more future sets of computing resources that will be respectively available at one or more future time periods. For example, in some implementations, the modular electronic can perform example method 900 of FIG. 9 to predict the one or more future sets of computing resources.

At 1006, the modular electronic device predicts an expected cost for performance of each of the one or more computing tasks by each of the one or more future sets of computing resources. For example, the predicted costs can be based on previous negotiations, previously observed advertisement, or other historical pricing data.

At 1008, the modular electronic device determines a schedule for performance of the one or more computing tasks based on the predicted costs. For example, at 1008, the modular electronic device can determine a schedule for performance of the one or more computing tasks that minimizes a total expected cost.

Figure 11:
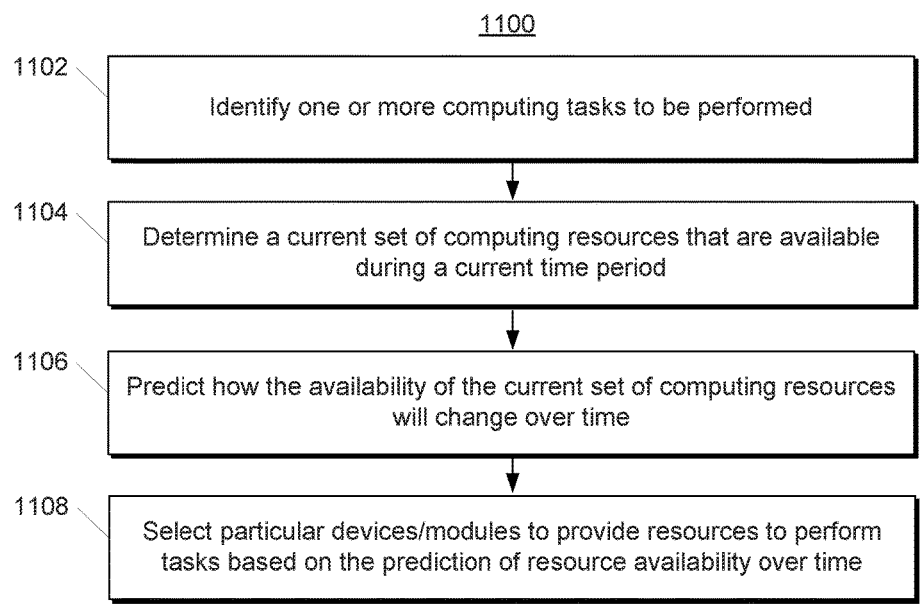
FIG. 11 depicts a flow chart diagram of an example method for scheduling task performance based on prediction of future capabilities according to example embodiments of the present disclosure.

FIG. 11 depicts a flow chart diagram of an example method 1100 for scheduling task performance based on prediction of future capabilities according to example embodiments of the present disclosure. Although method 1100 will be discussed with reference to an example modular electronic device, example method 1100 can be performed by a non-modular device instead.

At 1102, a modular electronic device identifies one or more computing tasks to be performed. For example, the computing tasks can be processing tasks, storage tasks, communication tasks, etc. The modular electronic device can include one or more modules.

In some implementations, identifying the one or more computing tasks to be performed at 1102 can include predicting at least a first computing task that will be requested to be performed in the future.

At 1104, the modular electronic device determines a current set of computing resources that are available during a current time period. At 1106, the modular electronic device predicts how the availability of the current set of computing resources will change over time. For example, the modular electronic device can analyze historical patterns in resource availability to predict changes over time. As another example, the modular electronic device can perform example method 900 of FIG. 9 to predict the one or more future sets of computing resources that will be available to the modular electronic device.

At 1108, the modular electronic device selects particular devices and/or modules to provide resources to perform the tasks based on the prediction of resource availability over time.

For example, in some implementations, selecting particular devices and/or modules to provide resources at 1108 can include determining, by the modular electronic device, whether to perform a first computing task of the one or more computing tasks with the current set of computing resources during the current time period or to schedule the first computing task for performance by one or more future sets of computing resources in one or more future time periods.

In one example of method 1100, a modular electronic device using resources from a particular module or device at 1104 can predict at 1106 that such particular module is about to become unavailable. In response, at 1108, the modular electronic device can change its communication to use resources from one or more other modules that are predicted to remain available longer. For example, the modular electronic device can stop receiving data from a server device if it predicts that the server connection will be soon lost, and can start communicating with a local device having needed resources.

In another example of method 1100, the modular electronic device can predict at 1106 that a module of a module network is about to become unavailable and can schedule at 1108 a tasklet on an alternate module (e.g., a cloud-based module) based on the prediction.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 8-11 respectively depict steps performed in a particular order for purposes of illustration and discussion, the methods of the present disclosure are not limited to the particularly illustrated order or arrangement. The various steps of the methods 800-1100 can be omitted, rearranged, combined, and/or adapted in various ways without deviating from the scope of the present disclosure.

What is claimed is:

1. A computer-implemented method for scheduling task performance based on prediction of future capabilities, the method comprising:

identifying, by an electronic device one or more computing tasks to be performed, wherein identifying, by the electronic device, the one or more computing tasks to be performed comprises predicting, by the electronic device, a first computing task that will be requested to be performed in at least one of the future time periods;

determining, by the electronic device, a current set of computing resources that are available to the electronic device during a current time period;

predicting, by the electronic device, one or more future sets of computing resources provided by one or more additional computing devices that are physically distinct from the electronic device that will be respectively available to the electronic device via an ad hoc wireless network at one or more future time periods; and determining, by the electronic device, a schedule for performance of the one or more computing tasks based at least in part on the prediction of the one or more future sets of computing resources that will be respectively available at the one or more future time periods;

wherein determining, by the electronic device, the schedule for performance of the one or more computing tasks comprises determining, by the electronic device, whether to perform the first computing task of the one or more computing tasks with the current set of computing resources during the current time period or to schedule the first computing task for performance by one of the future sets of computing resources in one of the future time periods; and wherein determining, by the electronic device, whether to perform the first computing task with the current set of computing resources during the current time period or to schedule the first computing task for performance by one of the future sets of computing resources in one of the future time periods comprises:

determining, by the electronic device, that the current set of computing resources is capable of performing the first computing task;

determining, by the electronic device, that at least one of the future sets of computing resources is incapable of performing the first computing task; and in response to a determination that the current set of computing resources is capable of performing the first computing task and at least one of the future sets of computing resources is incapable of performing the first computing task, causing, by the electronic device, performance of the first computing task by the current set of computing resources during the current time period.

2. The computer-implemented method of claim 1, wherein the method further comprises:

predicting, by the electronic device, one or more expected costs respectively associated with performance of a second computing task of the one or more computing tasks by the one or more future sets of computing resources that will be respectively available at the one or more future time periods;

wherein determining, by the electronic device, the schedule for performance of the one or more computing tasks comprises determining, by the electronic device, the schedule for performance of the one or more computing tasks based at least in part on the one or more expected costs respectively associated with the one or more future sets of computing resources and the one or more future time periods.

3. The computer-implemented method of claim 1, wherein predicting, by the electronic device, the one or more future sets of computing resources that will be respectively available to the electronic device at the one or more future time periods comprises:

receiving, by the electronic device, location data associated with the electronic device;

predicting, by the electronic device, a destination based at least in part on the location data; and determining, by the electronic device, a first set of computing resources associated with the destination.

4. The computer-implemented method of claim 3, wherein receiving, by the electronic device, location data associated with the electronic device comprises receiving, by the electronic device, at least one of: global positioning system data, calendar data that describes one or more future appointment locations, and mapping data that describes one or more locations for which a user has searched.

5. The computer-implemented method of claim 1, wherein predicting, by the electronic device, the one or more future sets of computing resources that will be respectively available to the electronic device at the one or more future time periods comprises:

identifying, by the electronic device, one or more location patterns exhibited by location data that describes a historical location of at least one of the electronic device and a user of the electronic device; and predicting, by the electronic device, the one or more future sets of computing resources that will be respectively available to the electronic device at the one or more future time periods based at least in part on the identified one or more location patterns.

6. The computer-implemented method of claim 1, wherein predicting, by the electronic device, the one or more future sets of computing resources that will be respectively available to the electronic device at the one or more future time periods comprises:

accessing, by the electronic device, a map that describes available computing resources at various locations;

predicting, by the electronic device, one or more future locations of the electronic device; and determining, by the electronic device, the one or more future sets of computing resources based at least in part on the resources described for the one or more future locations by the accessed map.

7. An electronic device, comprising:

at least one processor;

wherein the electronic device is configured:

to identify one or more computing tasks to be performed;

to determine a current set of computing resources that are available to the electronic device during a current time period;

to predict one or more future sets of computing resources that will be respectively available to the electronic device provided by one or more additional computing devices that are physically distinct from the electronic device via a wireless network at one or more future time periods; and to determine a schedule for performance of the one or more computing tasks based at least in part on the prediction of the one or more future sets of computing resources that will be respectively available at the one or more future time periods;

wherein to identify the one or more computing tasks to be performed, the electronic device is configured to predict a first computing task that will be requested to be performed in at least one of the future time periods;

wherein to determine the schedule for performance of the one or more computing tasks, the electronic device is configured to determine whether to perform the first computing task of the one or more computing tasks with the current set of computing resources during the current time period or to schedule the first computing task for performance by one of the future sets of computing resources in one of the future time periods; and wherein to determine whether to perform the first computing task with the current set of computing resources during the current time period or to schedule the first computing task for performance by one of the future sets of computing resources in one of the future time periods, the electronic device is configured:
- to determine that the current set of computing resources is capable of performing the first computing task;
- to determine that at least one of the future sets of computing resources is incapable of performing the first computing task; and
- in response to a determination that the current set of computing resources is capable of performing the first computing task and at least one of the future sets of computing resources is incapable of performing the first computing task, to cause performance of the first computing task by the current set of computing resources during the current time period.

8. The electronic device of claim 7, wherein the electronic device is further configured:
- to predict one or more expected costs respectively associated with performance of a second computing task of the one or more computing tasks by the one or more future sets of computing resources that will be respectively available at the one or more future time periods;
- wherein to determine the schedule for performance of the one or more computing tasks, the electronic device is configured to determine the schedule for performance of the one or more computing tasks based at least in part on the one or more expected costs respectively associated with the one or more future sets of computing resources and the one or more future time periods.

9. The electronic device of claim 7, wherein to predict the one or more future sets of computing resources that will be respectively available to the electronic device at the one or more future time periods, the electronic device is configured:
- to receive location data associated with the electronic device;
- to predict a destination based at least in part on the location data; and
- to determine a first set of computing resources associated with the destination.

10. At least one non-transitory computer-readable medium that stores instructions that, when executed by at least one processor of an electronic device, causes the at least one processor to:
- identify one or more computing tasks to be performed;
- predict one or more future sets of computing resources that will be respectively available to the electronic device at one or more future time periods, wherein at least one of the one or more future sets of computing resources are provided by one or more additional computing devices that are physically distinct from the electronic devices accessible over an ad hoc wireless network; and
- determine a schedule for performance of the one or more computing tasks based at least in part on the prediction of the one or more future sets of computing resources that will be respectively available at the one or more future time periods;
- wherein to identify the one or more computing tasks to be performed, the electronic device is configured to predict a first computing task that will be requested to be performed in at least one of the future time periods;
- wherein to determine the schedule for performance of the one or more computing tasks, the electronic device is configured to determine whether to perform the first computing task of the one or more computing tasks with the current set of computing resources during the current time period or to schedule the first computing task for performance by one of the future sets of computing resources in one of the future time periods; and
- wherein to determine whether to perform the first computing task with the current set of computing resources during the current time period or to schedule the first computing task for performance by one of the future sets of computing resources in one of the future time periods, the electronic device is configured:
  - to determine that the current set of computing resources is capable of performing the first computing task;
  - to determine that at least one of the future sets of computing resources is incapable of performing the first computing task; and
  - in response to a determination that the current set of computing resources is capable of performing the first computing task and at least one of the future sets of computing resources is incapable of performing the first computing task, to cause performance of the first computing task by the current set of computing resources during the current time period.

11. The at least one non-transitory computer-readable medium of claim 10, wherein the instructions that cause the at least one processor to determine the schedule for performance of the one or more computing tasks cause the at least one processor to
- predict one or more expected costs respectively associated with performance of a second computing task of the one or more computing tasks by the one or more future sets of computing resources that will be respectively available at the one or more future time periods; and
- determine the schedule for performance of the one or more computing tasks based at least in part on the one or more expected costs respectively associated with the one or more future sets of computing resources and the one or more future time periods.

12. The at least one non-transitory computer-readable medium of claim 10, wherein the instructions that cause the at least one processor to predict the one or more future sets of computing resources cause the at least one processor to:
- receive location data associated with the electronic device;
- predict a destination based at least in part on the location data; and
- determine a first set of computing resources associated with the destination.

13. The at least one non-transitory computer-readable medium of claim 12, wherein the instructions that cause the at least one processor to predict the destination based at least in part on the location data cause the at least one processor to:
- identify one or more location patterns exhibited by the location data associated with the electronic device; and
- predict the destination based at least in part on the identified one or more location patterns.

* * * * *